United States Patent

Kane et al.

Patent Number: 5,403,084
Date of Patent: Apr. 4, 1995

[54] MOLDED REFRIGERATOR SHELF WITH SNAP-IN SLIDE

[75] Inventors: Edmund J. Kane, Holland; Robert S. Herrmann, Grand Haven; Gregory T. Wolters, Holland; Donald C. Gilbert, Muskegon Heights, all of Mich.

[73] Assignee: Donnelly Corporation, Holland, Mich.

[21] Appl. No.: 153,501

[22] Filed: Nov. 15, 1993

Related U.S. Application Data

[63] Continuation of Ser. No. 912,778, Jul. 13, 1992, abandoned, which is a continuation-in-part of Ser. No. 665,661, Mar. 7, 1991, which is a continuation-in-part of Ser. No. 721,104, Jun. 25, 1991, Pat. No. 5,273,354.

[51] Int. Cl.6 .............................. F25D 11/00
[52] U.S. Cl. .............................. 312/408; 312/334.38; 108/93
[58] Field of Search .................... 312/408, 410, 334.38; 108/27, 93; 211/86, 134, 135, 187, 153, 113

[56] References Cited

U.S. PATENT DOCUMENTS

| D. 295,950 | 5/1988 | Johnston . |
| 392,061 | 10/1888 | Peckham . |
| 786,935 | 4/1905 | Wright . |
| 870,439 | 11/1907 | Kade . |
| 907,423 | 12/1908 | Tilley . |
| 1,119,982 | 12/1914 | Ohnstrand . |
| 1,805,584 | 5/1931 | Kemp . |
| 1,878,072 | 9/1932 | Vance . |
| 2,169,295 | 8/1939 | Shuart . |
| 2,197,982 | 4/1940 | O'Brien . |
| 2,252,997 | 8/1941 | Vanderveld . |
| 2,505,322 | 4/1950 | Drake . |
| 2,517,725 | 8/1950 | Schweller . |
| 2,537,804 | 1/1951 | Watkins . |
| 2,568,153 | 9/1951 | Hickman . |
| 2,599,607 | 6/1952 | Burrise . |
| 2,604,375 | 7/1952 | Beckett . |
| 2,613,818 | 10/1952 | Richard . |
| 2,626,773 | 1/1953 | Backman . |
| 2,657,894 | 11/1953 | Sklenar . |
| 2,681,786 | 6/1954 | Sparring . |
| 2,689,778 | 9/1954 | Chambers et al. . |
| 2,735,741 | 2/1956 | Laben . |
| 2,739,777 | 3/1956 | Schoenhardt . |
| 2,954,125 | 9/1960 | Husted . |
| 3,028,638 | 4/1962 | Goellner . |
| 3,063,772 | 11/1962 | Kennedy .............................. 312/308 |
| 3,082,880 | 3/1963 | Mapson . |
| 3,092,047 | 6/1963 | Chesley . |
| 3,102,499 | 9/1963 | Shelor . |
| 3,108,455 | 10/1963 | Hanson .............................. 62/382 |
| 3,120,077 | 2/1964 | Stoffel . |
| 3,127,146 | 3/1964 | Fisher . |
| 3,185,315 | 5/1965 | Andreassen . |
| 3,212,836 | 10/1965 | Johnson . |
| 3,220,364 | 11/1965 | Sandin . |
| 3,270,404 | 9/1966 | Andreassen . |
| 3,331,646 | 7/1967 | Peters . |

(List continued on next page.)

FOREIGN PATENT DOCUMENTS

| 0238288 | 4/1962 | Australia .............................. 312/408 |
| 0327933A2 | 2/1989 | European Pat. Off. . |
| 2111257 | 5/1972 | France . |
| 85357952 U | 3/1986 | Germany . |
| 90065131 U | 9/1990 | Germany . |
| 9011291 U | 11/1990 | Germany . |
| 90041801 U | 9/1991 | Germany . |
| 320487 | 11/1929 | United Kingdom . |
| 1002175 | 2/1979 | United Kingdom . |

Primary Examiner—Peter R. Brown
Assistant Examiner—Gerald A. Anderson
Attorney, Agent, or Firm—Price, Heneveld, Cooper, DeWitt & Litton

[57] ABSTRACT

A refrigerator shelf assembly with snap-in slides for supporting a sliding bin, receptacle or other separate member has a shelf panel and a front rim extending across at least a portion of a front edge of the shelf panel. The front rim extends below the shelf panel and defines at least one front slide receptacle. A back rim extends across at least a portion of a back edge of the shelf panel and below the shelf panel to define at least one back slide receptacle. A pair of slides for receiving and supporting a bin under the shelf panel are removably mounted in the front and back slide receptacles.

26 Claims, 9 Drawing Sheets

U.S. PATENT DOCUMENTS

| | | |
|---|---|---|
| 3,331,646 | 7/1967 | Peters . |
| 3,331,646 | 7/1967 | Peters . |
| 3,352,431 | 11/1967 | Smith . |
| 3,363,390 | 1/1968 | Crane et al. . |
| 3,429,628 | 2/1969 | Laszlo . |
| 3,446,361 | 5/1969 | Douty . |
| 3,561,714 | 2/1971 | Zurawski et al. . |
| 3,575,484 | 4/1971 | Kesling . |
| 3,603,274 | 9/1971 | Ferdinand et al. . |
| 3,604,669 | 9/1971 | Asher . |
| 3,633,983 | 1/1972 | Whitcomb . |
| 3,672,624 | 6/1972 | Keller . |
| 3,862,784 | 1/1975 | Heinrich . |
| 3,912,085 | 10/1975 | Cooke et al. . |
| 3,984,163 | 10/1976 | Boorman, Jr. et al. . |
| 4,015,543 | 4/1977 | Stankowitz . |
| 4,072,340 | 2/1978 | Morgan . |
| 4,139,234 | 2/1979 | Morgan . |
| 4,167,259 | 9/1979 | Bury . |
| 4,174,486 | 11/1979 | Winkler . |
| 4,242,848 | 1/1981 | Schoultz . |
| 4,543,283 | 9/1985 | Curtze et al. . |
| 4,627,201 | 12/1986 | Hamamoto et al. . |
| 4,723,809 | 2/1988 | Kida et al. . |
| 4,729,613 | 3/1988 | Tromble et al. . |
| 4,736,918 | 4/1988 | Bessinger . |
| 4,822,656 | 4/1989 | Hutter, III . |
| 4,841,698 | 6/1989 | Gold . |
| 4,870,907 | 10/1989 | McKee . |
| 4,923,260 | 5/1990 | Poulsen . |
| 4,934,541 | 6/1990 | Bussan et al. . |
| 4,938,442 | 7/1990 | Mastrodicasa . |
| 5,044,704 | 9/1991 | Bussan et al. ...................... 312/214 |

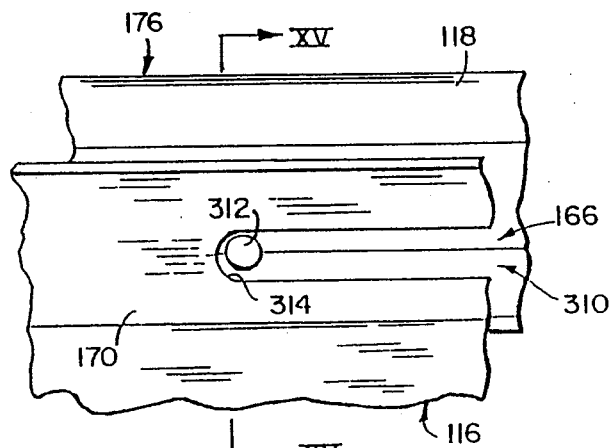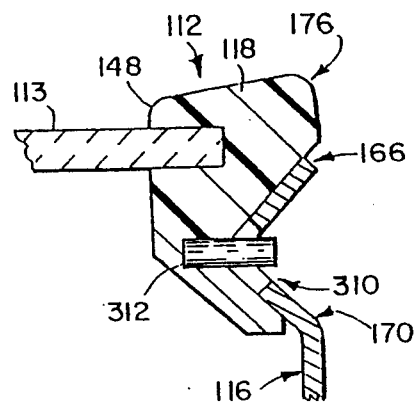
FIG. 14  FIG. 15
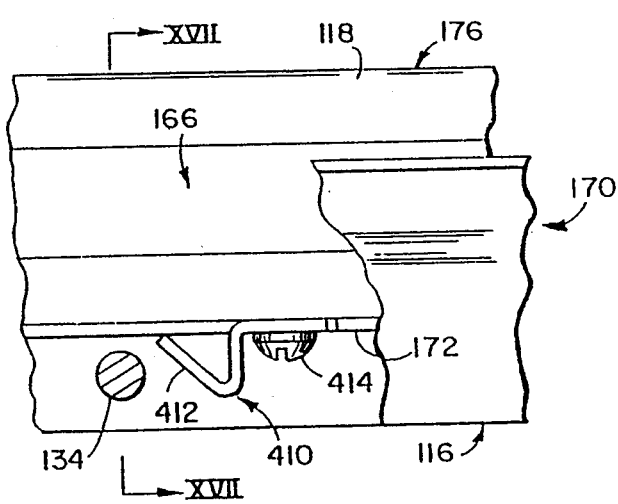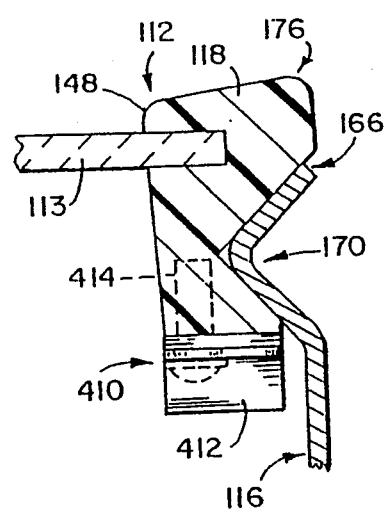
FIG. 16  FIG. 17
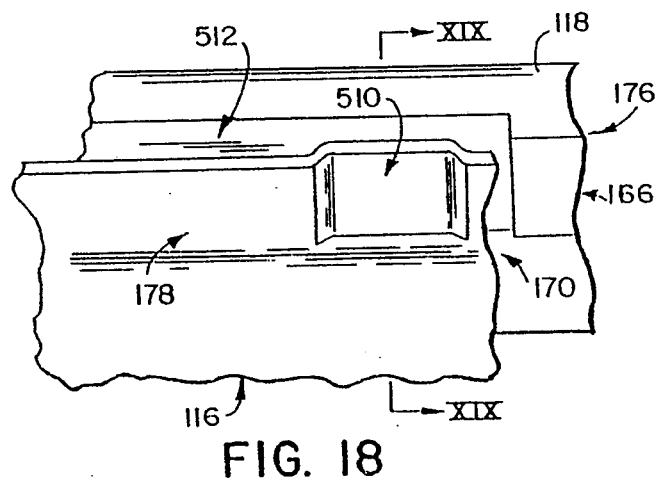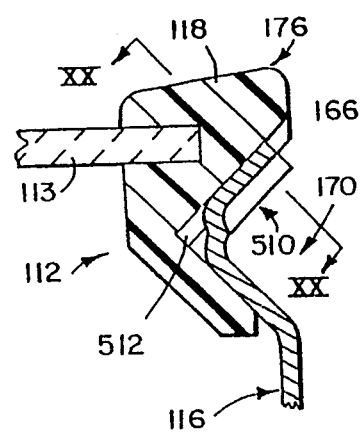
FIG. 18  FIG. 19

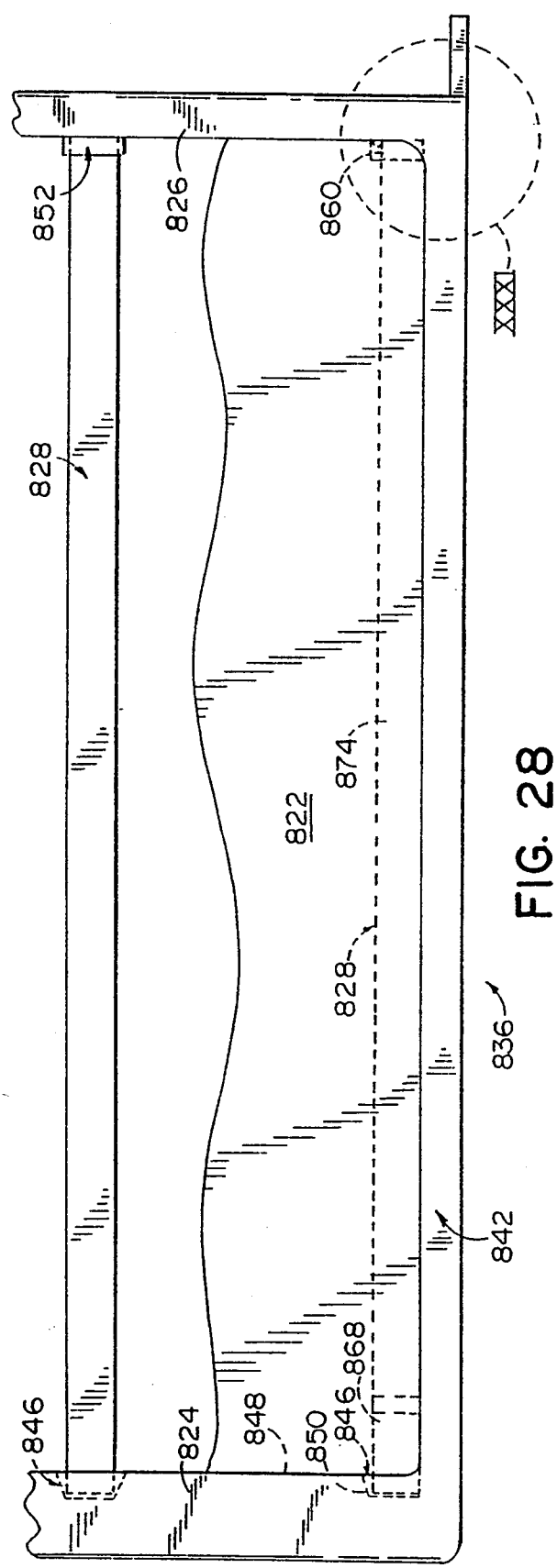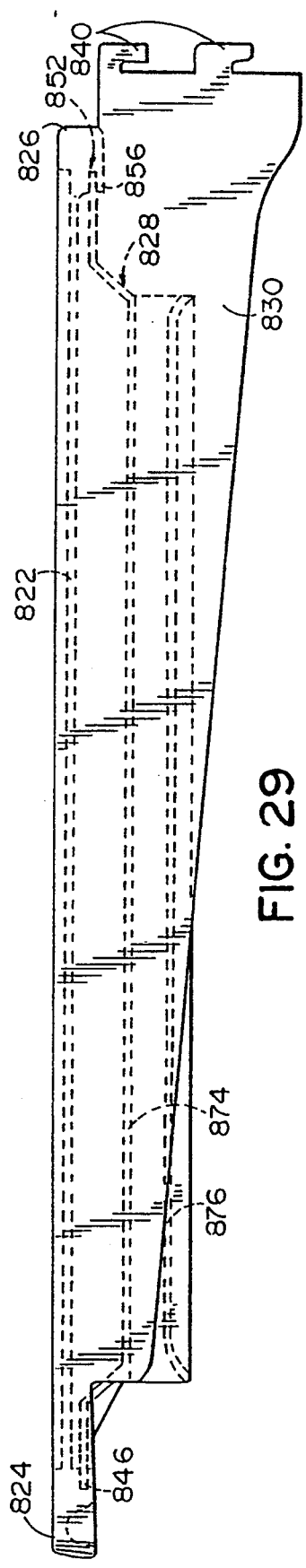

MOLDED REFRIGERATOR SHELF WITH SNAP-IN SLIDE

CROSS-REFERENCE TO RELATED APPLICATIONS

This is a file wrapper continuation of U.S. patent application Ser. No. 07/912,778, entitled MOLDED REFRIGERATOR SHELF WITH SNAP-IN SLIDE, and filed on Jul. 13, 1992, now abandoned, which is a continuation-in-part of U.S. patent application Ser. No. 07/665,661, filed Mar. 7, 1991, still pending, and entitled MOLDED REFRIGERATOR SHELF, which is a continuation-in-part of U.S. patent application Ser. No. 07/721,104, filed Jun. 25, 1991, now U.S. Pat. No. 5,273,354, and entitled MOLDED REFRIGERATOR SHELF AND SUPPORT BRACKET, the disclosures of which are each incorporated herein by reference.

BACKGROUND OF THE INVENTION

This invention relates to shelving for refrigerators and the like. More particularly, the present invention further relates to slide brackets for storage bins, drawers, pans, or other sliding members which are commonly used with refrigerator shelving.

Refrigerator shelving has evolved from fixed wire racks or even adjustable racks supported by simple brackets or pegs projecting from the interior walls of a refrigerator compartment, to the complex shelving units now widely available and commonly used in refrigerators. This evolution has been spurred by competitive refrigerator vendors seeking to make their products more adaptable and convenient to the needs and uses of each consumer. The result is numerous task or function specific shelf assemblies of varying width and comprising a variety of slidable drawers, storage bins, pans, et cetera, which are typically mounted under the shelf panel.

These complex shelving units commonly incorporate a plethora of equally complicated molded or extruded plastic and metal components which must be assembled to form the sophisticated shelving units. Typically, the width of the sliding member supported under the shelf panel of these complex shelving units is dictated by the width of the shelf assembly. Further, the support structure for the sliding member is typically riveted to supporting side brackets for the entire shelf assembly or otherwise fixed relative to the shelf panel. Thus, having a variety of shelf assembly widths mandates that a variety of sliding members must also be provided. This duplication rapidly increases costs for the manufacturer and vendor in terms of increased inventory and further in other production costs. Rather than running a production of standard width sliding members, the manufacturer must accommodate sliding members having a variety of widths, according to the width of the shelf assembly with which that sliding member will be used.

The commonly known refrigerator shelf assembly is also typically task-specific. A shelf assembly directed to supporting articles thereon is not readily convertible to the added task of providing under shelf sliding storage with a bin or drawer for example. Conversely, a shelf assembly directed to providing a sliding member under the shelf panel is also not commonly adaptable to the singular task of providing only a shelf. While the sliding member may often times be removed and set aside, the slides themselves which support the sliding member under the shelf panel are typically an integral part of the shelf assembly and may not be easily removed, but must remain, typically projecting downward from the shelf assembly and interfering with items stored on adjacent shelving, below the subject shelf panel.

The present invention addresses this evolution of expense and complexity with a uniquely simple refrigerator shelf assembly having versatility to easily overcome the above problems.

SUMMARY OF THE INVENTION

Accordingly, the present invention provides a snap-in slide unit for enhanced versatility of a refrigerator shelf assembly. A shelf assembly according to the invention includes a shelf panel, a front rim extending across at least a portion of a front edge of the panel and extending below the panel wherein a front slide receptacle having an opening is defined, a back rim extending across at least a portion of a back edge of the panel and extending below the panel wherein a back slide receptacle having an opening is defined, a slide to support a separate member in sliding engagement under the shelf panel, and means for releasably mounting the slide on the front and back rims without displacing the shelf panel from the front and back rims. More particularly, the slide is removably coupled with the front and back slide receptacles.

In one aspect of the invention, the front and back slide receptacles may open toward one another. Further, one of the front and back slide receptacles may have an access opening to facilitate releasable coupling of the slide. As another aspect of the invention, the slide has an elongated body portion with a front attachment member projecting from a front end of the elongated body and with a back attachment member projecting from an opposing back end of the elongated body in another aspect of the invention, the front and back slide receptacles are defined by a recess in each of the front and back rims of the shelf assembly, respectively. The front slide receptacle has an open side toward the back edge of the shelf panel and the back slide receptacle has an open side toward the front edge of the panel. In a further aspect of the invention, the shelf assembly is molded in one piece.

Thus, the present invention provides a simplified shelf assembly with a snap-in slide. Versatility of the shelf assembly is enhanced by the ease with which the slide is added to the shelf to support a sliding member under the shelf and the ease of removing the slide. A pair of slides for supporting a slide member may be uniformly spaced for use of standard width slide members regardless of the shelf assembly width. If a plurality of slide receptacles are provided, then the position of the slide member relative to the shelf assembly may also be easily adjusted.

The slide arrangement also enhances manufacturing and costs. The slide may be conveniently molded in a one-step process. The slide is also well-suited to use with a shelf having a molded rim and is especially suited to use with a one-piece, molded shelf assembly. This slide arrangement further suppresses costs by reducing inventory requirements of shelf assemblies to meet a variety of needs.

These and other objects, advantages and features of the present invention will become apparent upon review of the following specification in conjunction with the drawings.

BRIEF DESCRIPTION OF THE DRAWINGS

FIG. 14 is a fragmentary side elevation of the shelf of FIG. 2 showing a second, alternate embodiment of a shelf stop.

FIG. 15 is a fragmentary sectional view along section line XV—XV of the shelf of FIG. 14.

FIG. 16 is a fragmentary side elevation of the shelf of FIG. 2 with a third, alternate embodiment of a shelf stop.

FIG. 17 is a fragmentary sectional view along section line XVII—XIII of FIG. 16.

FIG. 18 is a fragmentary side elevation of the shelf of FIG. 2 showing a fourth, alternate embodiment of a shelf stop.

FIG. 19 is a fragmentary sectional view along section line XIX—XIX of FIG. 18.

FIG. 28 is a fragmentary plan view of the shelf assembly of FIG. 27.

FIG. 29 is a side elevational view of the shelf of FIG. 27.

DESCRIPTION OF THE PREFERRED EMBODIMENT

Figure 1:
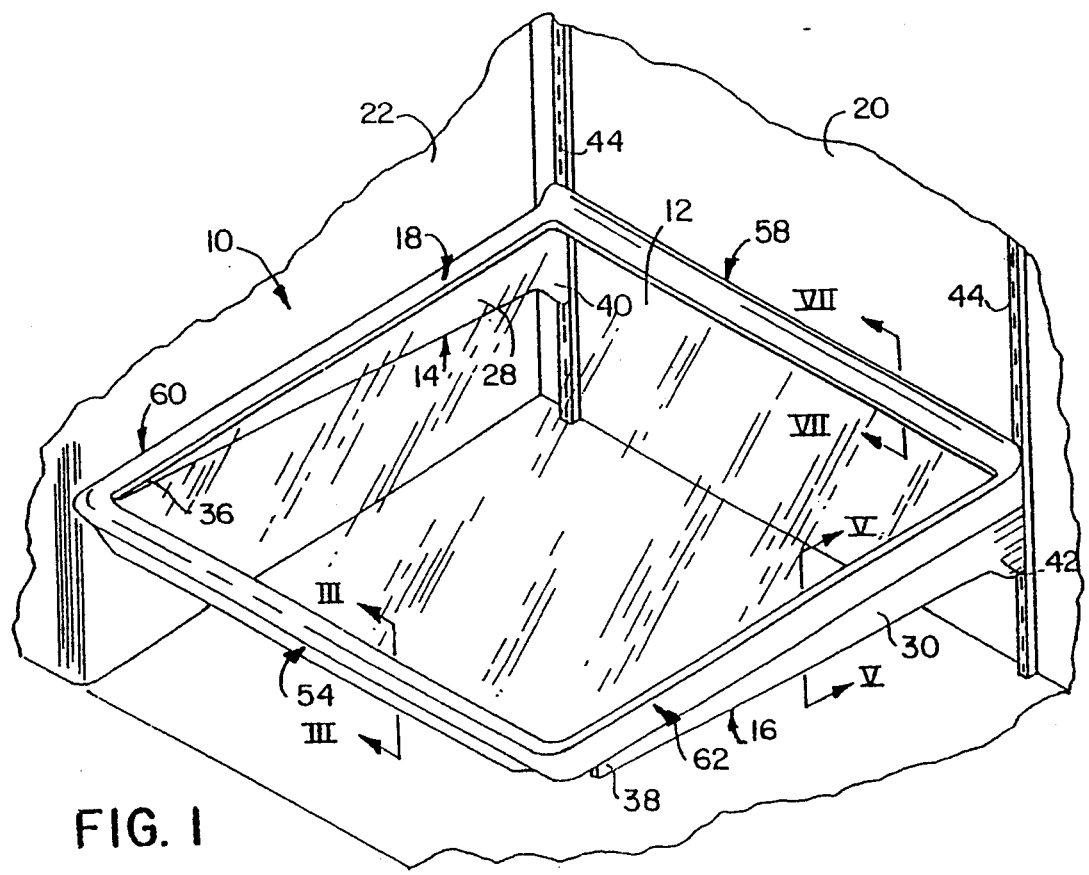
FIG. 1 is a fragmentary perspective view of the interior of a refrigerator showing a shelf according to the present invention.

Referring now to the drawings in greater detail and FIG. 1 in particular, a refrigerator shelf assembly 10 according to the present invention comprises a generally planar shelf member 12, metal support brackets 14 and 16 and a molded, resinous perimeter rim 18. Shelf assembly 10 is preferably cantilevered forward by brackets 14 and 16 from the rear wall 20 of a refrigerator.

Shelf member 12 may be a light transmitting material, preferably optically clear tempered glass, to enhance light distribution through the refrigerated compartment. Shelf member 12 has a perimeter edge 22 (FIGS. 3 and 5) which is supported above brackets 14 and 16 and positioned to overlap above inwardly projecting flange portions 26 of the brackets. Flange portions 26 project inwardly toward each other at the top edge of generally vertical web portions 30 of each bracket 14 and 16. Thus, the brackets 14 and 16 are mirror image replicas of each other.

Figure 9:
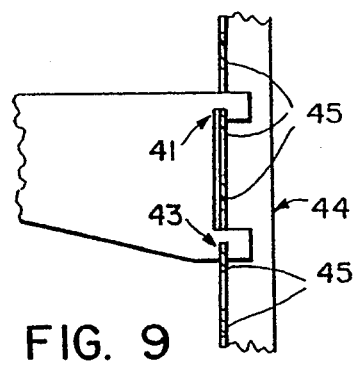
FIG. 9 is a fragmentary side elevational view showing the rear end a support bracket.
Figure 13:
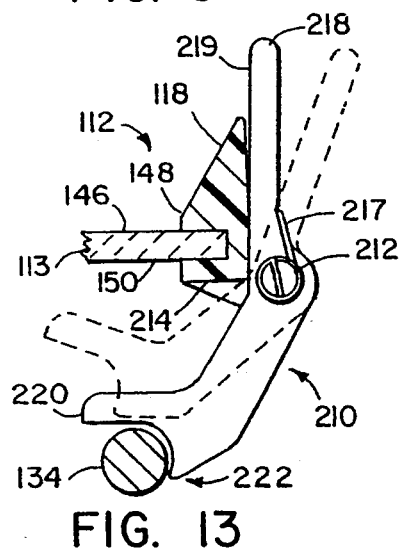
FIG. 13 is a fragmentary sectional view along section line XIII—XIII of the shelf stop of FIG. 11.
Figure 10:
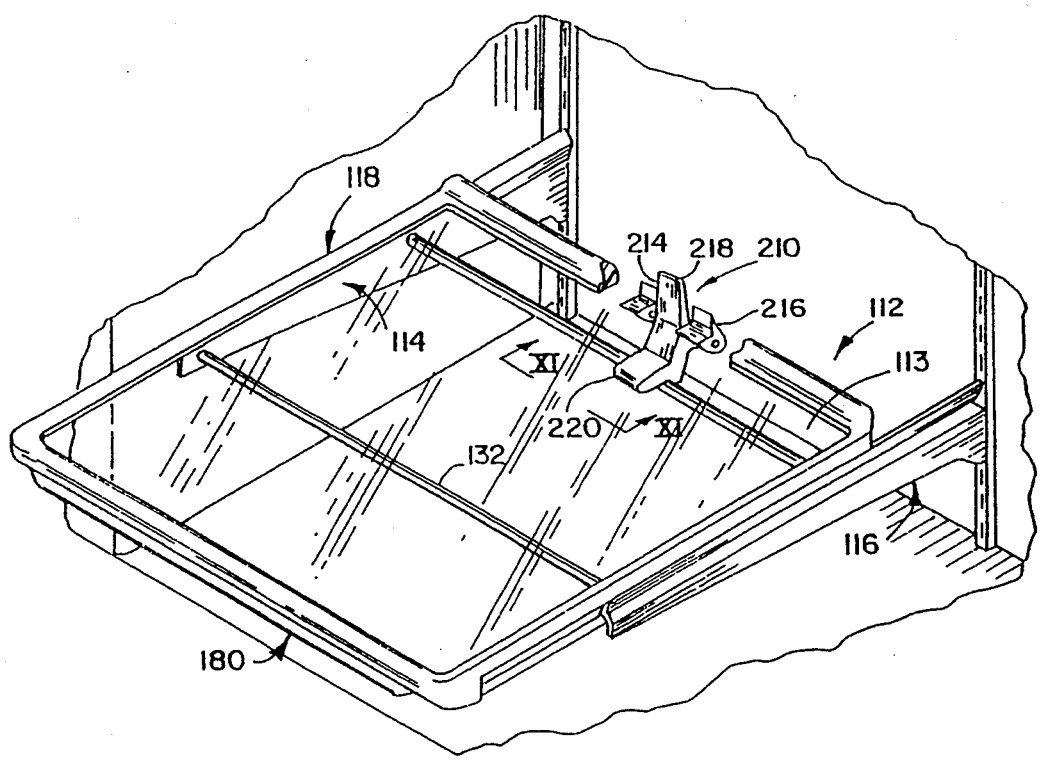
FIG. 10 is a partially fragmentary perspective view of the shelf of FIG. 2 partially extended and showing a first embodiment of a shelf stop.
Figure 11:
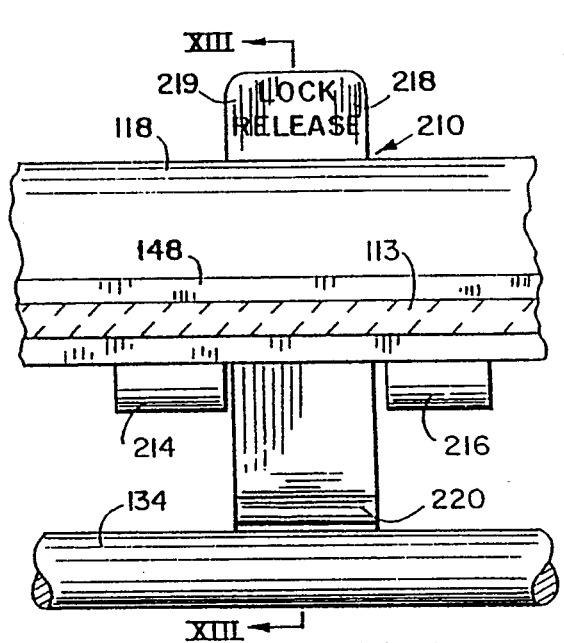
FIG. 11 is a fragmentary sectional view along section line XI—XI of the shelf stop of the shelf of FIG. 10.
Figure 12:
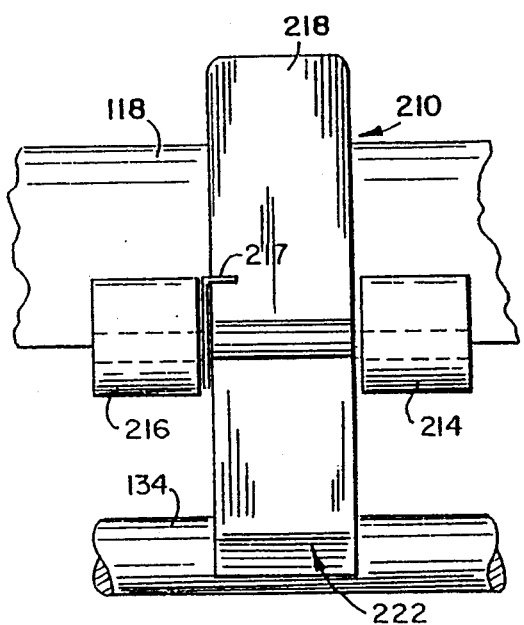
FIG. 12 is a fragmentary rear elevation of the shelf stop of FIG. 11.

While shelf assembly 10 may be used as a fixed shelf, it is preferably used as a vertically adjustable shelf. Therefore, as shown in FIG. 9, the rear ends 40 and 42 of brackets 14 and 16 are preferably adapted for releasable engagement with shelf tracks 44 provided on rear wall 20 of the refrigerator as is commonly practiced. Recesses 41 and 43 function as hooks which engage over rungs 45 in tracks 44 to suspend the brackets. Thus, shelf assembly 10 may be positioned at a plurality of locations spaced vertically along tracks 44. Shelf assembly 10 is preferably sized to provide air circulation space between side portions 60 and 62 and the side walls 22 of the refrigerator as well as between rear edge 58 and rear wall 20 of the refrigerator to provide for proper circulation around the shelf. Further, the length of shelf assembly 10 is determined to provide air circulation space between the front edge 54 and the door (not shown) of the refrigerator.

Figure 5:
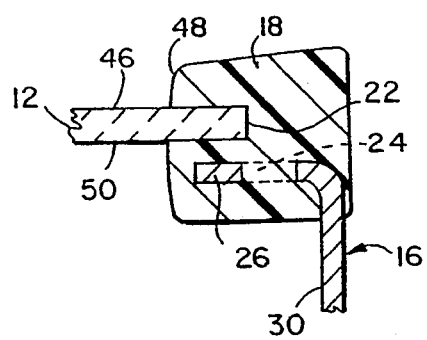
FIG. 5 is a fragmentary sectional view along section line V—V of a side edge of the shelf of FIG. 1.

Rim 18 is molded around the entire perimeter edge 22 of shelf member 12 as well as flanges 26 of brackets 14 and 16 for tight engagement and connection of shelf member 12 with brackets 14 and 16 (FIG. 5). Each of the flanges 26 is provided with a series of perforations 24 to assure secure mechanical connection between rim 18 and each support bracket 14, 16. During assembly, shelf member 12 and support brackets 14 and 16 are held and positioned within a mold while a moldable material from which rim 18 is made is injected and flows into the mold around the peripheral edge 22 of shelf member 12 and flange portions 26 and through perforations 24, encapsulating the edge 22 and flange portions 26. The moldable material of which rim 18 is comprised may include copolymer plastics such as a combination of ethylene and polypropylene or other structural, resinous plastic such as ABS or polyvinyl chloride. Further, a coloration pigment added to the moldable plastic used for molding rim 18 prior to molding to provide desired colors to the rim. For example, titanium dioxide may be added for a white coloration.

Figure 7:
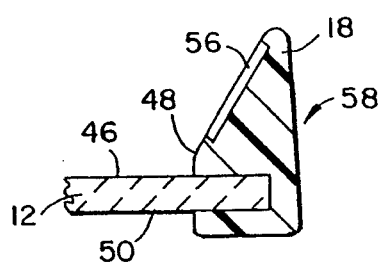
FIG. 7 is a fragmentary sectional view along section line VII—VII of the rear edge of the shelf of FIG. 1.

As the moldable material cures, i.e., cools, hardens and sets up, it becomes a tough and resilient mass extending continuously around the perimeter edge 22 of shelf member 12 for holding shelf member 12 in position above the flange portions 26 of support brackets 14 and 16. The inward extension of flanges 26 provides secure, stable support for shelf 12. Rim 18 is molded to extend above the top surface 46 of shelf member 12 and is specifically molded to define a continuous vertical wall 48 near the perimeter edge 22 of shelf member 12 forming a spill dam for containing spills occurring upon the shelf member 12 (FIGS. 3, 5 and 7).

While the seal formed between rim 18 and shelf member 12 by molding rim 18 around shelf member 12 performs quite satisfactorily, depending on the specific resinous plastic chosen, one may wish to enhance the seal by coating perimeter edge 22 and the adjoining top 46 and bottom 50 surfaces of shelf member 12, adjacent perimeter edge 22, prior to the molding of rim 18 therearound with a primer layer or coating of a heat activatable, resinous material which promotes and facilitates the adhesion of the rim material to the glass shelf member 12.

Figure 3:
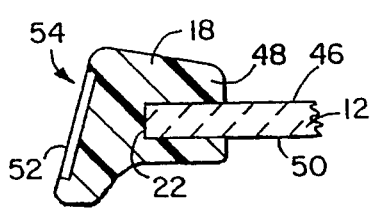
FIG. 3 is a fragmentary sectional view along section line III—III of the front edge of the shelf of FIG. 1.

As shown in FIG. 3, a decorative trim piece 52 may be molded into rim 18 along the front edge 54 of shelf member 12. Likewise, a decorative trim piece 56 may be molded into rim 18 along the rear edge 58 of shelf member 12 (FIG. 7).

Figure 2:
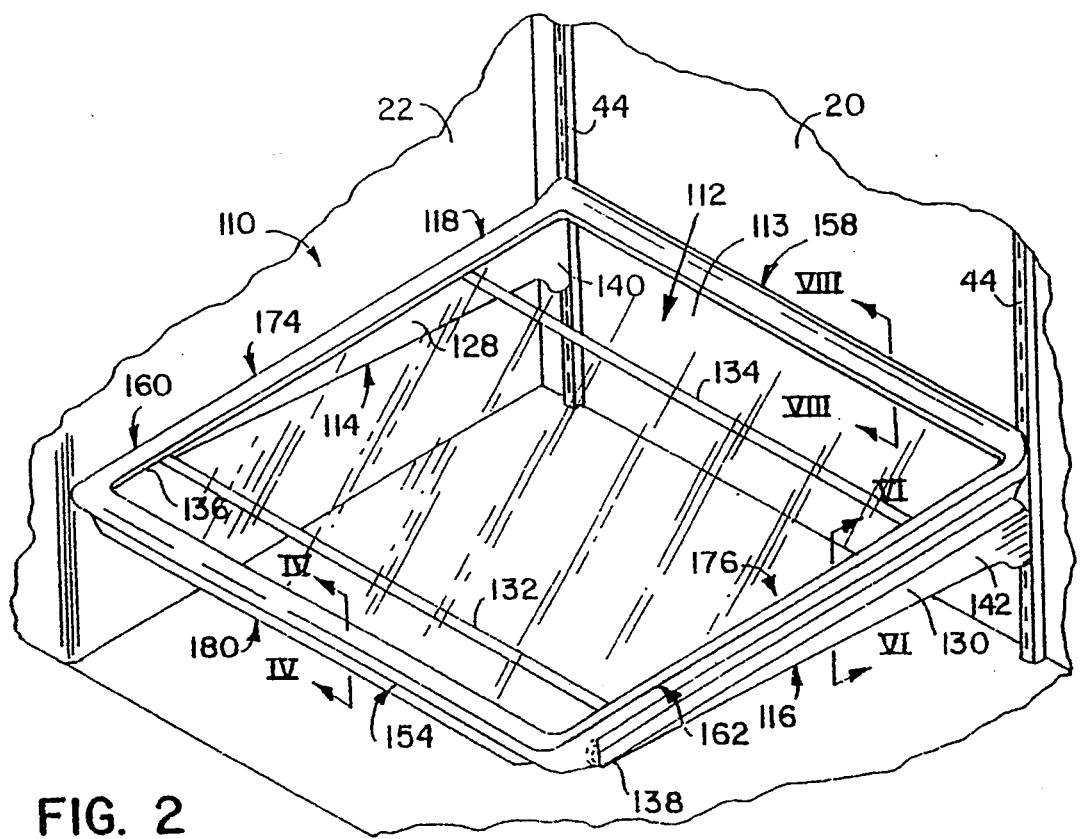
FIG. 2 is a fragmentary perspective view of the interior of a refrigerator showing a sliding shelf according to the present invention.

Alternatively, a slidable shelf assembly 110, according to the present invention, is shown in FIG. 2 comprising a slidable shelf member 112, metal support brackets 114 and 116, and a molded, resinous perimeter rim 118. Shelf assembly 110 is also preferably cantilevered forward by brackets 114 and 116 from the rear wall 20 of a refrigerator.

Figure 6:
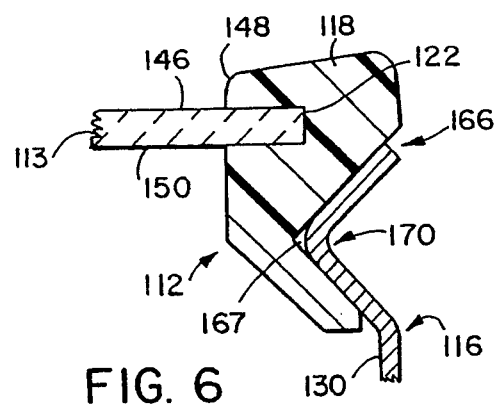
FIG. 6 is a fragmentary sectional view along section line VI—VI of a side edge of the shelf of FIG. 2.

Shelf member 112 comprises a generally planar shelf panel 113 and rim 118. Shelf panel 113 may be a light transmitting material, preferably optically clear tempered glass, to enhance light distribution through the refrigerated compartment. Shelf panel 113 has a perimeter edge 122 which is encapsulated by perimeter rim 118 (FIG. 6).

Figure 8:
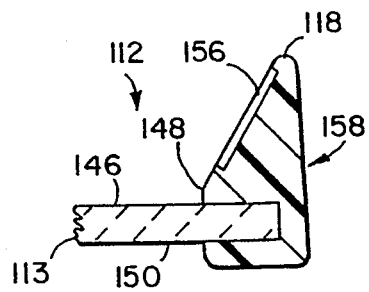
FIG. 8 is a fragmentary sectional view along section line VIII—VIII of the rear edge of the shelf of FIG. 2.

Rim 118 is molded around the perimeter edge 122 of shelf panel 113. During assembly, shelf panel 113 is held in position within a mold while a moldable material is injected and flows into the mold around perimeter edge 122. Again, the moldable material may be a copolymer plastic or other structural plastic. Also, a coloration pigment, as discussed above, may be added to the plastic used for molding rim 118. Rim 118 is also molded to extend above the top surface 146 of shelf panel 113 and is specifically molded to define a continuous vertical wall 148 near the perimeter edge 122 of shelf panel 113 forming a spill dam for containing spills occurring upon the shelf member 112 (FIGS. 4, 6 and 8).

The seal between rim 118 and shelf panel 113 may be enhanced by coating perimeter edge 122 and the top 146 and bottom 150 surfaces of shelf panel 113 near perimeter edge 122 with a primer layer of a heat activatable, resinous material as described above.

Figure 4:
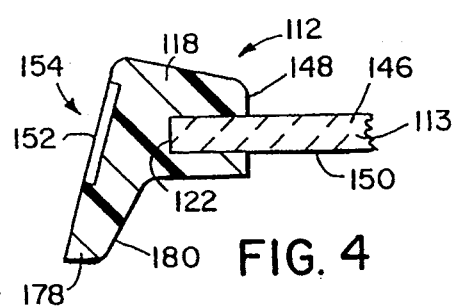
FIG. 4 is a fragmentary sectional view along section line IV—IV the front edge of the shelf of FIG. 2.

A shelf pull 180 is molded along the front edge 154 of shelf member 112 by extending the lower edge 178 of rim 118 downwardly (FIG. 4). Further, as shown in FIG. 4, a decorative trim piece 152 may be molded into rim 118 along the front edge 154 of shelf member 112. A decorative trim piece 156 may also be molded into rim 118 along the rear edge 158 of shelf member 112 (FIG. 8).

As is best seen in FIGS. 2 and 6, a generally V-shaped channel is preferably molded into the outwardly facing side surface of each side portion 160 and 162 of rim 118 to define slide guides 166. A corresponding, generally V-shaped ridge 167 is formed along the top edges 126 of each support bracket 114 and 116 defining slide rails 170 for sliding engagement with the slide guides.

The support brackets 114 and 116 of shelf assembly 110 are mirror image replicas of each other, having rear ends 140 and 142 identical to bracket ends 40 and 42 of brackets 14 and 16, and preferably adapted for releasable engagement with shelf tracks 44. Tracks 44 are provided on rear wall 20 of the refrigerator as is commonly practiced for vertically adjustable shelf positioning of the shelf assembly 110 along tracks 44. A pair of cross braces 132 and 134 connecting between webs 128 and 130 of support brackets 114 and 116 are provided for holding the support brackets in spaced relation to each other. Brace 132 is connected to each web 128 and 130 near the forward ends 136 and 138 of brackets 114 and 116. Brace 134 is connected to each web 128 and 130 at a position approximately one-third to one-half of the length of brackets 114 and 116 forward of ends 140 and 142. Cross braces 132 and 134 are required in sliding shelf assembly 110 to stabilize the support brackets 114 and 116 and to maintain the proper positioning of front ends 136 and 138 of the brackets, precluding the front ends from spreading apart as a load is applied to the shelf assembly 110. Shelf assembly 110 also includes one of several embodiments 210, 310, 410, 510, 610 or 710 of a shelf stop to preclude the inadvertent overextension of the slidable shelf.

A first alternative embodiment of a shelf stop is shown in FIGS. 10-13 comprising a lever 210 mounted on a pivot rod 212 and a pair of pivot rod mounts 214 and 216 projecting downward from the rear edge 158 of shelf member 112, near bottom surface 150. Lever 210 has a top end 218 which projects above the perimeter rim 118 for manipulation by a user. Lever 210 also has a lower end 220 defining a catch 222 for engagement with cross braces 132 and 134. As the shelf member 112 is slid forward, the catch 222 approaches and engages the brace 134 precluding further extension of the shelf. The relative position of brace 134 controls the extension of shelf member 112 and is preferably approximately one-third to one-half the length of brackets 114 and 116 forward of ends 140 and 142. The shelf stop may be released by sliding the shelf rearward sufficiently to move catch 222 away from brace 134 and moving the lever 210 to a release position as shown in phantom in FIG. 13. Lever 210 is easily pivoted to the release position by pressing rearward on face 219 of lever 210 near its top end 218. With the lever in the release position, the catch 222 can slide above and past the brace 134. If the lever 210 is released to pass brace 134 and allowed to return to its latch position, the catch 222 will engage the other brace 132 as the shelf member 112 is extended. By keeping the lever 210 in the release position, shelf member 112 can be fully removed. A return spring 217 may be mounted with lever 210 to bias the lever to the latch position. Alternatively, lever 210 may be designed so that the force of gravity is sufficient to bias the lever to the latch position.

A second, alternative shelf stop embodiment is shown in FIGS. 14 and 15 comprising a slot 310 cut into at least one slide rail 168 and 170 and a cooperating stop pin 312 mounted in a fixed position and projecting from perimeter rim 118 at the corresponding slide guide 164 and 166 into the slot 310. The slot 310 has a front end wall 314 and a rear end wall (not shown) to limit the movement of pin 312 for limiting the extension and retraction of shelf assembly 110. The length and position of the slot 310 in combination with the position of the stop pin 312 will dictate the length of extension for shelf member 112, which is preferably in the range of one-third to one-half the length of the shelf support brackets 114 and 116. Use of this shelf stop embodiment generally precludes the removal of the shelf member 112 from the support brackets 114 and 116, but does not inhibit the removal of the entire shelf assembly 110 from the refrigerator compartment. Brackets 114 and 116 must be assembled to shelf member 112 with stop pins 312 received in slots 310 before mounting the entire assembly on tracks 44.

A third, alternative embodiment of a shelf stop is shown in FIGS. 16 and 17 comprising a formed metal clip 410 mounted to the bottom surface 172 of the perimeter rim 118 along at least one side portion 174 and 176 of the rim 118. The clip 410 is configured with an inclined front abutting surface 412 for engagement with a cross brace 132 or 134 to limit the extension of the shelf member 112. The relative position of clip 410 will determine the extension of shelf member 112. Clip 410 is preferably bent from a strap of steel or formed from other resilient material so that the clip 410 will deform when forced past the cross brace and will resume its original configuration once past the cross brace. Clip 410 is preferably removably mounted to the perimeter rim 118 by a screw 414 so that it can be removed rather than requiring that it be forced past the cross brace during assembly and disassembly of the shelf assembly 110. Alternately, the shelf assembly can be removed from tracks 44 and disassembled.

Figure 20:
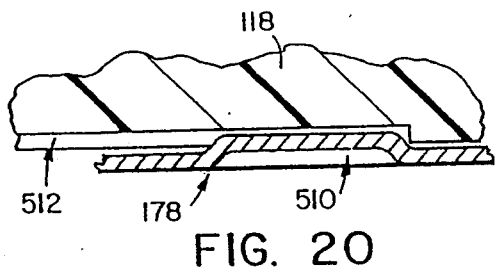
FIG. 20 is a fragmentary sectional view along section line XX—XX or FIG. 19.

A fourth, alternative embodiment of a shelf stop is shown in FIGS. 18-20 comprising a detent 510 pressed out of the side 178 of at least one of the slide rails 168 and 170 and a corresponding groove or channel 512 cut or molded into the side of the corresponding slide guide 164 and 166. The relative position of detent 510 and the relative position and length of channel 512 will control the extension of shelf member 112. Again, the brackets with slide rails 168 and 170 are assembled to shelf 112 such that detent 510 is received in channel 512 prior to mounting the entire assembly in tracks 44.

Figure 21:
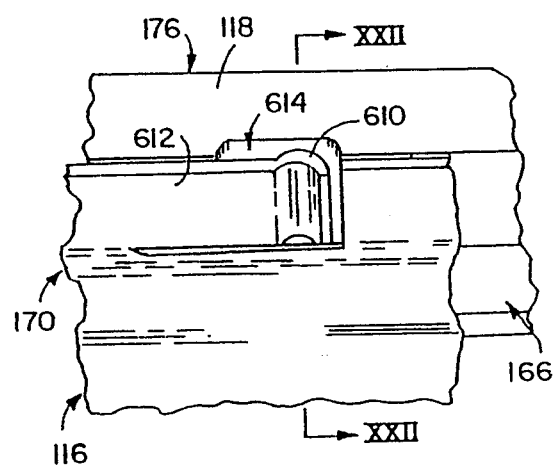
FIG. 21 is a fragmentary side elevation of the shelf of FIG. 2 showing a fifth, alternate embodiment of a shelf stop.
Figure 22:
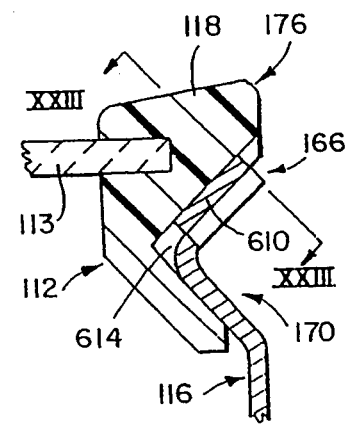
FIG. 22 is a fragmentary sectional view along section line XXII—XXII of FIG. 21.
Figure 23:
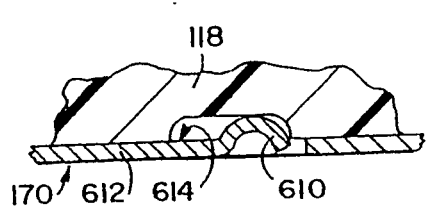
FIG. 23 is a fragmentary sectional view along section line XXIII—XXIII of FIG. 22.

A fifth, alternative shelf stop is shown in FIGS. 21-23 comprising a detent 610 projecting from the end of a flexible finger 612 formed in at least one of the slide rails 168 and 170 and a notch 614 cut or molded into the side of the corresponding slide guide 164 and 166. Again, the relative positioning of the detent and notch will determine the extension of shelf member 112. Also, shelf member 112 can be removed from the support brackets 114 and 116 by forcing the notch 614 past the resilient detent 610.

Figure 26:
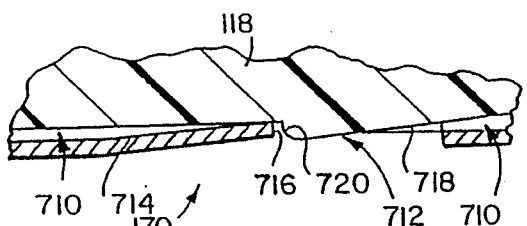
FIG. 26 is a fragmentary sectional view along section line XXVI—XXVI of FIG. 25.
Figure 25:
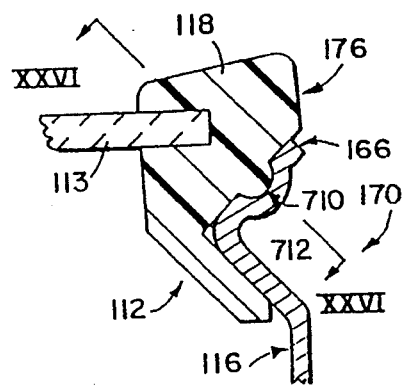
FIG. 25 is a fragmentary sectional view along section line XXV—XXV of FIG. 24.
Figure 24:
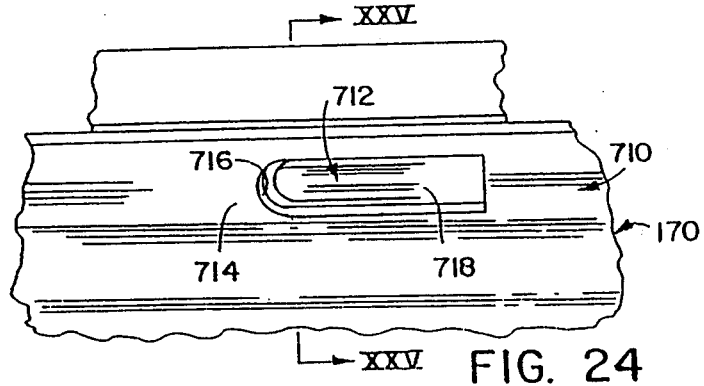
FIG. 24 is a fragmentary side elevation of the shelf of FIG. 2 showing a sixth, alternate embodiment of a shelf stop.

A sixth, alternative shelf stop embodiment is shown in FIGS. 24-26 comprising a groove 710 formed in at least one of slide rails 168 and 170 and a cooperating protrusion 712 formed on the corresponding slide guide 164 and 166. An inclined camming surface 714 with an end wall 716 projecting into the groove 710 is formed over a portion of the length of the groove 710. The protrusion 712 is molded with a cooperating inclined camming surface 718 and upstanding end wall 720 so that the shelf member 112 can be assembled by sliding the shelf member 112 into the front ends 140 and 142 of support brackets 114 and 116 and forcing protrusion 712 past the stop wall 716 in the groove. The perimeter rim 118 material of which the protrusion 712 is formed is sufficiently flexible and resilient so that protrusion 712 will deform as its camming surface 718 engages and slides over the camming surface 714 of the rail groove 710 and will resume its undeformed configuration once end wall 720 is past the stop end wall 716. Removal of shelf member 112 must be accomplished by removal of the entire assembly from tracks 44 followed by removing brackets 114 and 116 from the slide rails 168 and 170.

Figure 27:
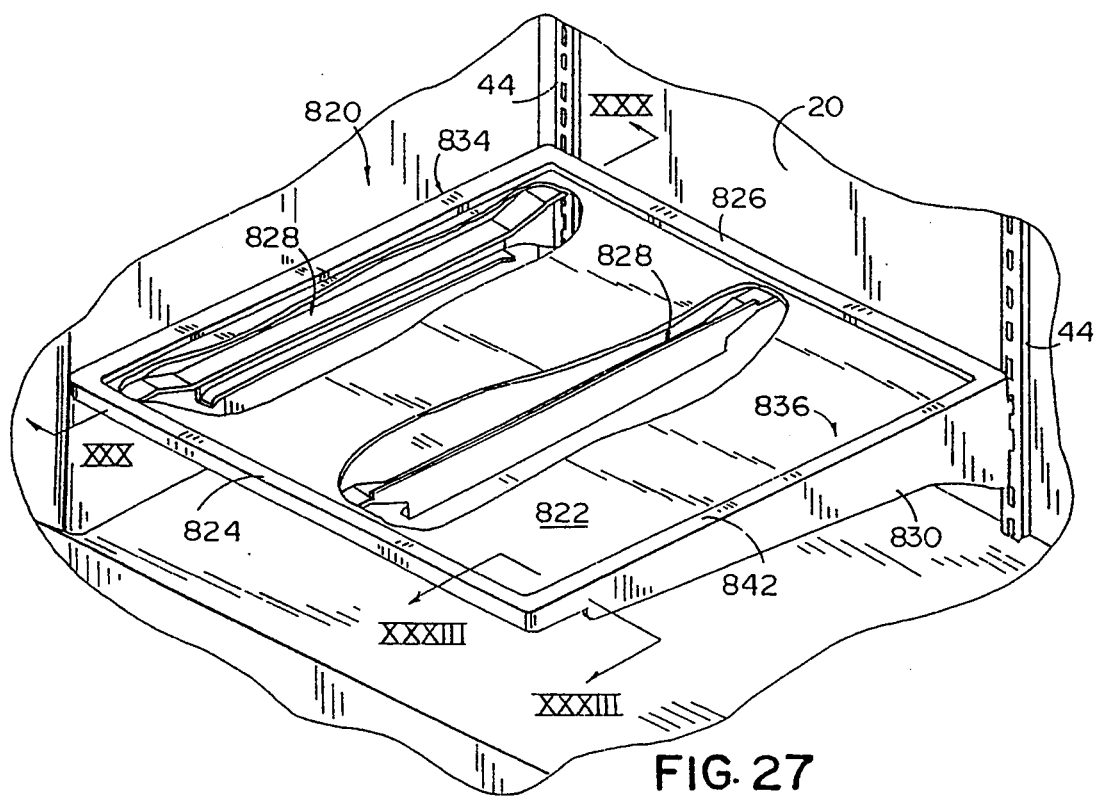
FIG. 27 is a perspective view of a third alternative embodiment of a shelf assembly according to the present invention, shown in a refrigerator.

Now generally referring to drawing FIGS. 27-34, a third alternative embodiment of a shelf assembly 820 according to the present invention includes a shelf panel 822 having a front rim portion 824, and a back rim portion 826, and preferably a pair of slides 828 (FIG. 27).

Figure 30:
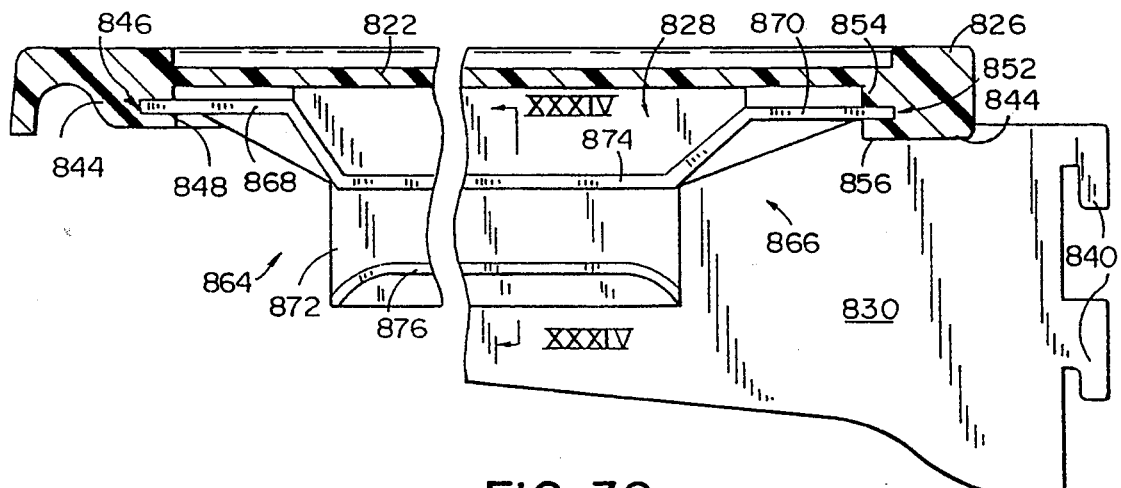
FIG. 30 is a broken sectional view along section line XXX—XXX of FIG. 27.

In the embodiment shown in FIG. 27, shelf assembly 820 further includes a pair of support brackets 830 which may cantilever forward from a rear wall 20 of a refrigerator. Brackets 830 are preferably elongated members which extend along at least a portion of opposing sides 834 and 836 of shelf assembly 820. Most preferably, brackets 830 releasably engage shelf tracks 44 provided on rear wall 20, for vertical adjustment of shelf assembly 820. Brackets 830 therefore have hooks 840 formed at a back end of brackets 830 for engaging rungs in tracks 44 (FIGS. 29 and 30).

Figure 32:
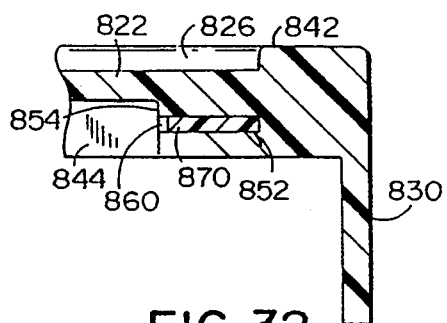
FIG. 32 is a fragmentary sectional view along section line XXXII—XXXII of FIG. 31.
Figure 33:
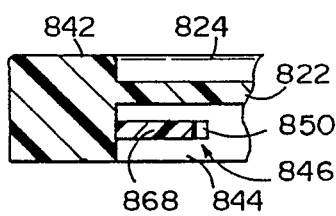
FIG. 33 is a fragmentary sectional view along section line XXXIII—XXXIII of FIG. 27.
Figure 31:
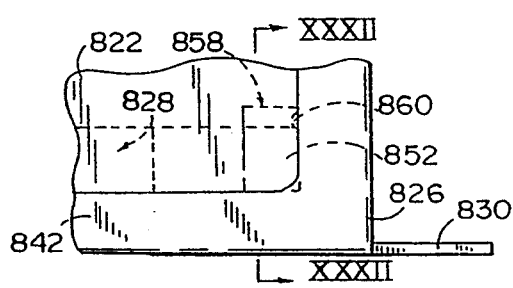
FIG. 31 is an enlarged view of detail XXXI of FIG. 28.

Shelf panel 822 is supported by brackets 830 and may be contoured to facilitate a variety of specific purposes, but generally provides a planar surface to support items placed thereon for storage in a refrigerator. Most preferably, shelf panel 822 is circumscribed by a perimeter rim 842 which incorporates front portion 824 and back portion 826 (FIGS. 27, 31, and 32). Brackets 830 may be separate plastic or metal components or molded in one piece with perimeter rim 842.

Shelf panel 822 may be formed from a light-transmitting material, preferably optically clear, tempered glass, to enhance light distribution through the refrigerator compartment, as discussed in greater detail above and disclosed in the above-referenced and incorporated patent applications Ser. Nos. 07/665,661 and 07/721,104. In the present embodiment as shown in FIG. 27, however, shelf panel 822, brackets 830, and perimeter rim 842 are most preferably one piece, molded in a convenient one-step process. During this process, a moldable material is injected and flows into a continuous cavity mold, defining entire shelf assembly 820. The moldable material may be any of a variety of suitable plastic materials, including copolymer plastics such as a combination of ethylene and polypropylene or other structural, resinous plastics such as ABS or polyvinyl chloride for example. Further, a coloration pigment to provide desired colors may be added to the moldable plastic material. A whitening coloration such as titanium dioxide may be used for example.

As the moldable material cures, that is cools, hardens, or sets up, it becomes a tough and resilient mass, forming shelf panel 822, perimeter rim 842, and support brackets 830 in one piece. Perimeter rim 842 may be molded to project above the surface of shelf panel 822 and form a spill dam as shown in the embodiment of FIGS. 27–34, or may be made flush with the top surface of the shelf panel, similar to the embodiment shown in FIG. 35. In either embodiment, perimeter rim 842 includes at least a lower portion 844 which extends below shelf panel 822 (FIGS. 30–32).

A front slide receptacle 846 is preferably defined in lower portion 844 of front rim portion 824 during the molding process and may be provided at any desired location along front rim portion 824 and at a desired number of locations, including, but not limited to, adjacent each side 834 and 836 of shelf assembly 820 for example (FIGS. 28 and 32). Each front slide receptacle 846 comprises a recess defined in a rear surface 848 of the lower portion 844 of front rim portion 824 and extending generally parallel to shelf 822. Each front slide receptacle 846 is a generally rectangular recess having a height and a width which is greater than its height. Further, each front slide receptacle 846 has an angled side wall 850 (FIGS. 28 and 32). Wall 850 is angled to accommodate the addition and removal of slide 828 which is discussed further below.

Similarly, a back slide receptacle 852, corresponding to each front slide receptacle 846, may likewise be defined in lower portion 844 of back rim portion 826 (FIGS. 29–31). Alternatively, each back slide receptacle 852 is preferably defined between a forward projecting portion 854 of back rim portion 826 which extends below shelf panel 822, and a cooperating tab 856 which projects forward from back rim portion 826 and is spaced below portion 854. Each back slide receptacle 852 is a generally rectangular slot extending generally parallel to shelf 822 and having a height and a width greater than its height. Further, each back slide receptacle 852 has an open side 858 located away from the adjoining shelf assembly side 834, 836. Back slide receptacle 852 also includes a retainer 860 formed by a protrusion or half-cylinder projection at open side 858 (FIG. 31 and 32).

A plurality of cooperating front and back slide receptacles 846, 852 may also be provided along each of front rim portion and back rim portion 824, 826, respectively, so that slides 828 may be positioned along the length of front and back rim portions 824 and 826. Thus, a slide member supported by slides 828 may selectively be positioned along the width of the shelf assembly 820, and slide members of various widths may be accommodated.

Slide 828 is an elongated member with opposing front and back ends 864 and 866, respectively (FIG. 30). A tab 868 extends from front end 864 and forms a front attachment member having a generally rectangular cross-sectional shape corresponding to front slide receptacle 846. Likewise, a back tab 870 extends from back end 866, forming a back attachment member having a generally rectangular cross-sectional shape corresponding to back slide receptacle 852.

Figure 34:
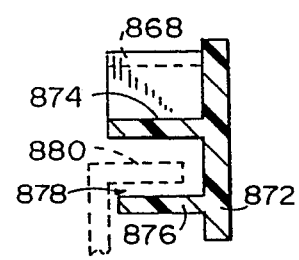
FIG. 34 is a cross-sectional view the slide of the shelf assembly taken along section line XXXIV—XXXIV of FIG. 30.
Figure 36:
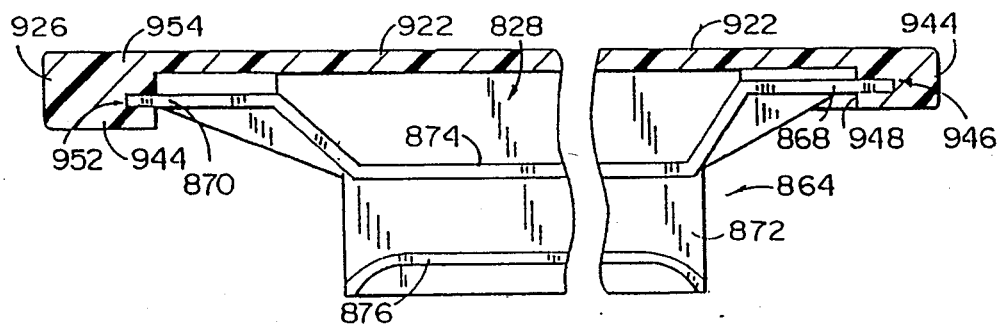
FIG. 36 is a broken sectional view along section line XXXVI—XXXVI of FIG. 35.

A body portion of slide 828 is defined by a generally vertically oriented plate portion 872 and a pair of vertically spaced rails 874 and 876 projecting generally perpendicular to vertical plate 872 and toward the same general direction from one side of vertical plate 872 (FIG. 34). Vertical plate 872 and the rails 874, 876 define an open-sided, open-ended slide track 878 for receiving and supporting a cooperating slide member 880 of a storage bin, drawer, pan, or other separate member for use in the refrigerator. Rail 876 includes downwardly curved ends so that the supported slide member, bin, or drawer can more easily be slid into place. The upper rail 874 merges with front and back tabs 868 and 870 at each of the ends 864, 866 of slide 828, respectively. Thus, slide 828 is symmetrical end to end and eliminates the need for left- and right-hand counter parts.

In use, a slide 828 is easily installed by positioning the front and back tabs 868, 870 of slide 828 parallel to, adjacent, and under shelf panel 822, inserting front tab 868 into a front slide receptacle 846, and swinging back tab 870 through open side 858, past retainer 860, and into a corresponding back slide receptacle 852. As back tab 870 is swung past retainer 860, slide 828 snaps into pace generally parallel with bracket 830. Slide 828 is simply removed by reversing the installation steps. Since slide 828 is preferably symmetrical end to end so that left-hand and right-hand side slides are not necessary, an identical unit may be installed in either a left-hand or right-hand position.

Figure 35:
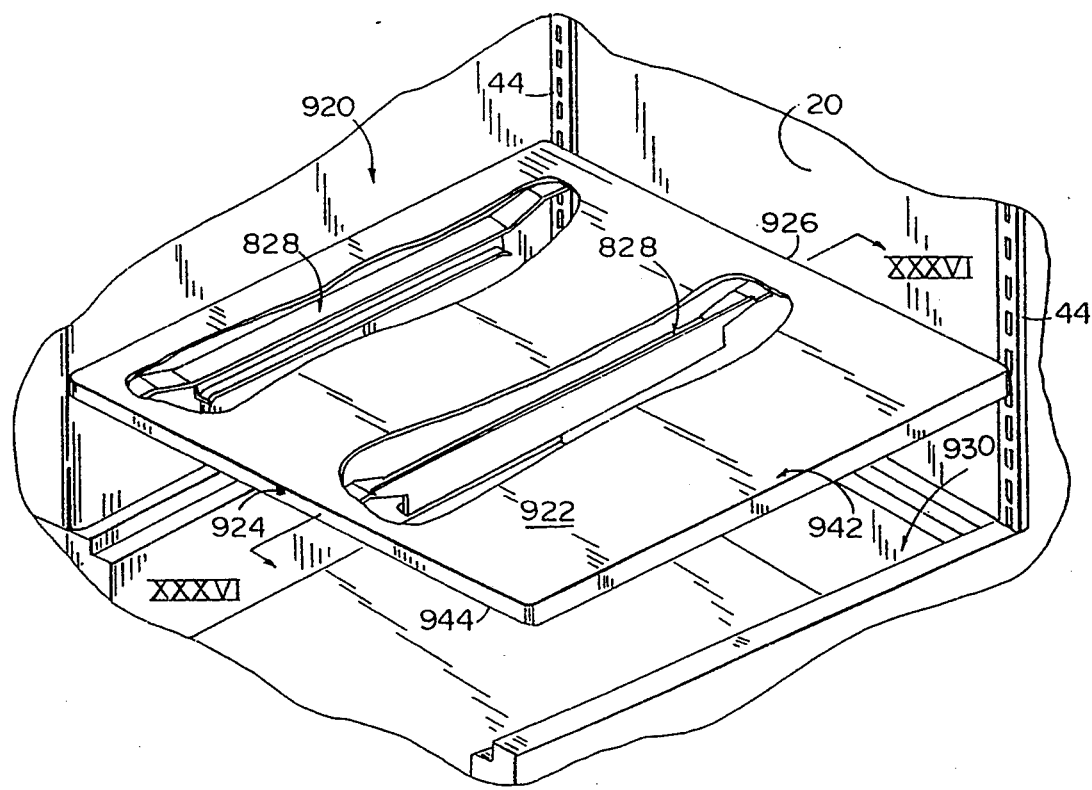
FIG. 35 is a perspective view of a fourth alternative embodiment of a shelf assembly according to the present invention.

A fourth alternative embodiment, shelf assembly 920, according to the present invention is shown in FIG. 35 and includes a shelf panel 922, a front rim portion 924, a back rim portion 926 and a pair of slides 828. Shelf assembly 920 is preferably used as a bottom refrigerator shelf and may be positioned in a cooperating recess 930 provided at the bottom of a refrigerator as shown in FIG. 35, or may be supported by other methods commonly known in the refrigerator shelf field.

Shelf assembly 920 is most preferably molded in one piece from a moldable material as discussed above. In shelf assembly 920, a perimeter rim 942, including front portion 924 and back portion 926, may be molded to project above a top surface of shelf panel 922 to form a spill dam. Alternately and preferably, the rim is molded flush with the top surface of shelf panel 922 as shown in FIG. 35. In either rim embodiment, perimeter rim 942 includes at least a lower portion 944 which extends below shelf panel 922. As shown in FIGS. 30–33 and discussed above regarding shelf assembly 820, shelf assembly 920 also includes front slide receptacles 846 and back slide receptacles 852 defined in front rim portion 924 and back rim portion 926, respectively, for releasably coupling with slide 828.

Figure 37:
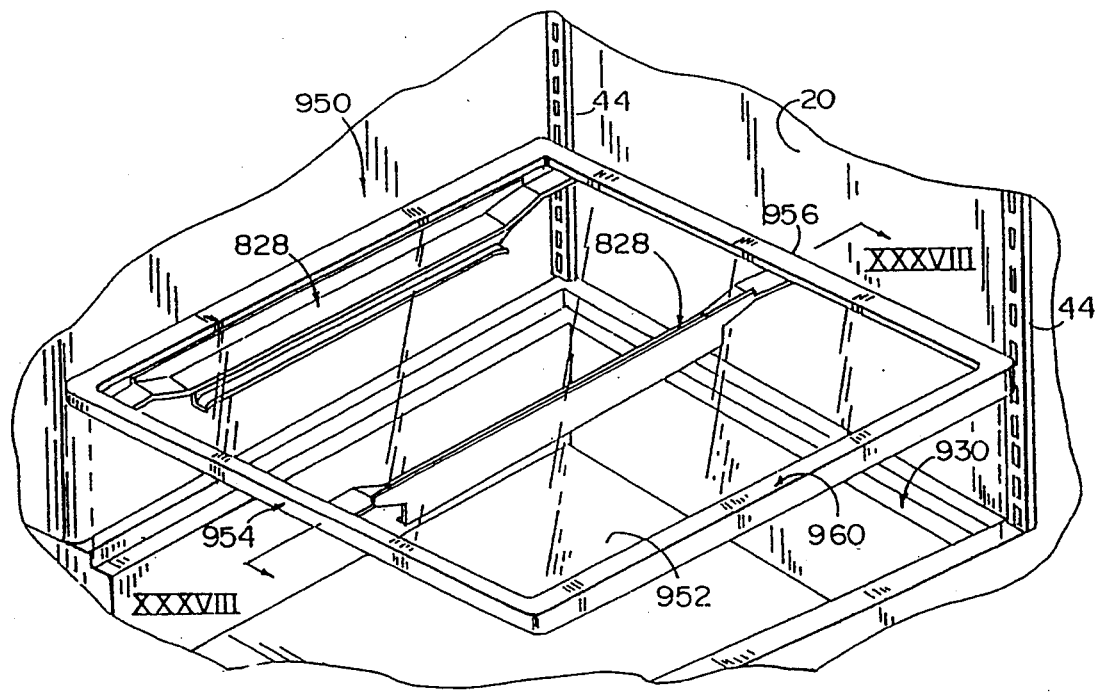
FIG. 37 is a perspective view of a fifth alternative embodiment of a shelf assembly according to the present invention.

A fifth alternative embodiment of a shelf assembly 950 is shown in FIG. 37. Shelf assembly 950 includes a shelf panel 952, a front rim 954, and a back rim 956. Shelf assembly 950 may be used as a bottom refrigerator shelf and supported by a variety of methods in a bottom shelf position, including a cooperating recess 930 provided at the bottom of a refrigerator as shown in FIG. 37 for example.

Figure 38:
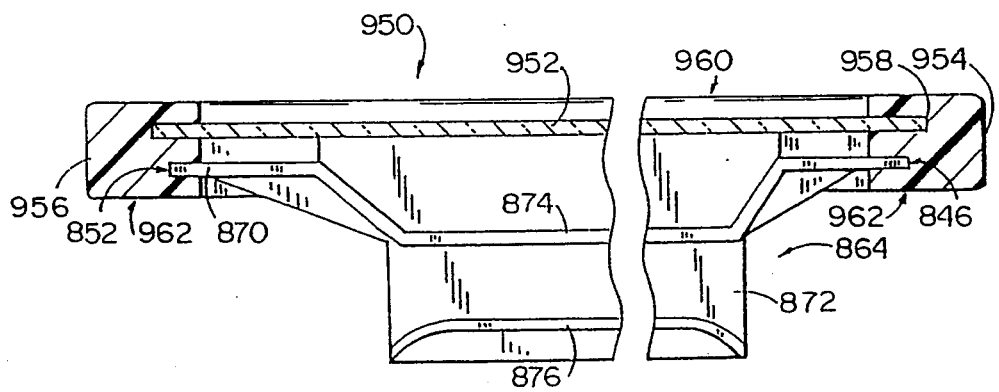
FIG. 38 is a broken sectional view along section line XXXVIII—XXXVIII of FIG. 37.

Shelf panel 952 is preferably optically clear tempered glass or other light-transmitting material to enhance light distribution through the refrigerator compartment. Shelf panel 952 has a perimeter edge 958 which is preferably encapsulated by a perimeter rim 960 (FIG. 38). Rim 960 incorporates front rim 954 and back rim 956 and is molded around perimeter edge 958 of shelf panel 952. Shelf panel 952 is held in position within a mold during assembly while a moldable material is injected and flows into the mold around perimeter edge 958 as discussed in greater detail above. Rim 960 is molded to extend above shelf panel 952, specifically to form a spill dam for containing spills which may occur upon shelf member 950 (FIGS. 37 and 38).

Rim 960 includes a lower portion 962 which extends below shelf panel 952. Shelf assembly 950 also includes front slide receptacles 846 and back slide receptacles 852 defined in front rim 954 and back rim 956, respectively, for releasably coupling with slide 828 as discussed in greater detail above regarding shelf assembly 820.

While alternative embodiments of the invention have been shown and described, other forms will now be apparent to one skilled in the art and to those who make or use the invention. Therefore, it will be understood that the embodiments shown in the drawings and described above are merely for illustrative purposes and are not intended to limit the scope of the invention which is defined by the claims which follow.

The embodiments of the invention in which an exclusive property or privilege is claimed are defined as follows:

1. A refrigerator shelf assembly comprising:
   a shelf panel having a panel front edge and a panel back edge;
   a front rim extending across at least a portion of said panel front edge, extending below said shelf panel, and defining at least one front slide receptacle therein, said front slide receptacle having an opening and being positioned below said shelf panel;
   a back rim extending across at least a portion of said panel back edge, extending below said shelf panel, and defining at least one back slide receptacle therein, said back slide receptacle having an opening and being positioned below said shelf panel, said front and back slide receptacles opening toward one another;
   at least one slide to receive and support a separate member in sliding engagement under said shelf panel, said slide being removably coupled with said front slide receptacle and said back slide receptacle; and
   means for releasably mounting said slide on said front rim and said back rim, in said front and back slide receptacles, while said front rim remains positioned at said panel front edge and said back rim remains positioned at said panel back edge.

2. The shelf assembly of claim 1, wherein said shelf panel extends along a defined plane and wherein said means for releasably mounting said slide includes an access opening to at least one of said front and back slide receptacles for receiving a portion of said slide therein, whereby said portion of said slide is positioned in said one receptacle without passing said slide through said plane of said shelf panel.

3. The shelf assembly of claim 2, wherein said access opening extends generally parallel to said plane of said shelf panel and wherein said slide is mounted in said one receptacle by moving said slide into said one receptacle through said access opening, in a direction generally parallel to said plane of said shelf panel.

4. The shelf assembly defined in claim 1, wherein said slide has:
   an elongated body with opposing front and back ends;
   a front attachment member projecting from said front end and releasably engaging said front slide receptacle; and
   a back attachment member projecting from said back end and releasably engaging said back slide receptacle.

5. The shelf assembly defined in claim 4, wherein each of said front and back attachment members has a generally rectangular cross-sectional shape and each of said front and back slide receptacles has a corresponding rectangular cross-sectional shape.

6. The shelf assembly defined in claim 5, wherein said attachment member and said slide receptacle cross-sectional shapes are wider than they are thick, with the width positioned generally parallel with said shelf panel.

7. The shelf assembly defined in claim 6, wherein said one receptacle includes a retainer to retain said slide in said one receptacle.

8. The shelf assembly defined in claim 4, wherein said shelf panel, said front rim, and said back rim are one piece.

9. The shelf assembly defined in claim 8, wherein at least one of said front and back rims is flush with a top surface of said shelf panel.

10. The shelf assembly defined in claim 8, wherein at least one of said front and back rims projects above a top surface of said shelf panel.

11. The shelf assembly defined in claim 1, wherein said shelf panel is tempered glass and each of said front rim and said back rim is formed of a moldable material.

12. The shelf assembly of claim 1 further including at least one shelf bracket to support said shelf panel, said front and back rims, and said slide in a refrigerated compartment.

13. The shelf assembly defined in claim 1, wherein the shelf assembly further includes a perimeter rim which incorporates each of said front and back rims, said perimeter rim circumscribing said shelf assembly and projecting above a top surface of said shelf panel to define a spill dam to contain a liquid disposed upon said top surface.

14. The shelf assembly defined in claim 13, wherein said shelf panel includes a perimeter edge which incorporates each of said front and back edges and wherein said perimeter rim is formed in one piece about said perimeter edge of said shelf panel from a moldable material.

15. The shelf assembly defined in claim 1, wherein one of said back and front slide receptacles includes a retainer to retain said slide in coupled connection with said one receptacle.

16. A refrigerator shelf assembly comprising:
   a shelf panel having a panel front edge and a panel back edge;
   a front rim extending across at least a portion of said panel front edge, extending below said shelf panel, and defining at least one front slide receptacle in said front rim, said front slide receptacle being positioned below said shelf panel;
   a back rim extending across at least a portion of said panel back edge, extending below said shelf panel, and defining at least one back slide receptacle in said back rim, said back slide receptacle being positioned below said shelf panel and having an open side facing toward said front rim, said front slide receptacle having an open side facing toward said back rim; and a slide to receive and support a separate member in sliding engagement under said shelf panel, said slide having a front attachment member extending from said slide and removably coupled with said front slide receptacle and having a back attachment member extending from said slide in a direction opposite said front attachment member and removably coupled with said back slide receptacle;

at least one of said front and back slide receptacles having an access opening whereby said slide is coupled with and removed from said one receptacle while said shelf panel remains in place.

17. The shelf assembly defined in claims 16 wherein one of said front attachment member and said back attachment member is inserted into and withdrawn from the corresponding one of said front slide receptacle and said back slide receptacle in a first direction extending between said slide front end and said slide back end.

18. The shelf assembly defined in claim 17 wherein the other of said front attachment member and said back attachment member is inserted into and withdrawn from the corresponding one of said front slide receptacle and said back slide receptacle in a second direction extending generally along a length of the corresponding one of said panel front edge and said panel back edge.

19. The shelf assembly defined in claim 18 wherein the one of said front slide receptacle and said back slide receptacle which corresponds to said other of said front attachment member and said back attachment member includes a retainer to retain said other of said front attachment member and said back attachment member in said one of said front slide receptacle and said back slide receptacle which corresponds to said other of said front attachment member and said back attachment member.

20. The shelf assembly defined in claim 19 wherein at least one of said front and back rims is flush with a top surface of said shelf panel.

21. The shelf assembly defined in claim 19 further including a perimeter rim which incorporates each of said front rim and said back rim, said perimeter rim circumscribing said shelf panel and projecting above a top surface of said shelf panel to define a spill dam to contain a liquid disposed upon said top surface.

22. In a refrigerator shelf assembly having a shelf panel, a front rim extending below the shelf panel, and a back rim extending below the shelf panel, the improvement of a slide to receive and support a separate member in sliding engagement under said shelf panel, comprising:

said slide being an elongated body having a front end and an opposing back end;

a front attachment member projecting from said front end to releasably couple with the front rim;

a back attachment member projecting from said back end, in a direction opposite said front attachment member to releasably couple with the back rim;

first means defining a cooperating front slide receptacle in the front rim for releasably coupling with said front attachment member, said front slide receptacle having an opening facing the back rim;

second means defining a cooperating back slide receptacle in the back rim for releasably coupling with said back attachment member, said back slide receptacle having an opening facing the front rim; and at least one of said first and second means including an access opening whereby the corresponding one of said front and back attachment members is coupled with and removed from said one means while said shelf panel, said front rim, and said back rim remain mounted to one another in said refrigerator shelf assembly.

23. The improved shelf assembly defined in claim 22 wherein one of said front attachment member and said back attachment member is inserted into and withdrawn from the corresponding one of said front slide receptacle and said back slide receptacle in a first direction extending between said slide front end and said slide back end.

24. The improved shelf assembly defined in claim 23 wherein the other of said front attachment member and said back attachment member is inserted into and withdrawn from the corresponding one of said front slide receptacle and said back slide receptacle in a second direction extending along a length of the corresponding one of said panel front edge and said panel back edge.

25. The improved shelf assembly defined in claim 24 wherein the one of said front slide receptacle and said back slide receptacle which corresponds to said other of said front attachment member and said back attachment member includes a retainer to retain said other of said front attachment member and said back attachment member in said one of said front slide receptacle and said back slide receptacle which corresponds to said other of said front attachment member and said back attachment member.

26. A refrigerator shelf assembly comprising:

a shelf panel having a panel front edge and a panel back edge;

a front rim extending across at least a portion of said panel front edge and below said shelf panel, said front rim having a recess positioned below said shelf panel, said recess defining a front slide receptacle, said front slide receptacle having an open side facing toward said panel back edge;

a back rim extending across at least a portion of said panel back edge and below said shelf panel, said back rim having a recess positioned below said shelf panel, said recess defining a cooperating back slide receptacle aligned with said front slide receptacle, said back slide receptacle having an open side facing toward said panel front edge; and a slide to receive and support a separate member in sliding engagement under said shelf panel, said slide having a slide front end and an opposing slide back end, having a front attachment member projecting from said slide front end, and having a back attachment member projecting from said slide back end in a direction opposite said front attachment member, said front attachment member releasably engaging said front slide receptacle, said back attachment member releasably engaging said back slide receptacle;

at least one of said front slide receptacle and said back slide receptacle further including an access opening whereby said front attachment member and said back attachment member engage and release from the corresponding front slide receptacle and back slide receptacle, while said shelf panel is mounted on said front and back rims.

* * * * *